Sept. 22, 1970   R. W. REITHERMAN   3,530,321
ELECTRIC MOTOR WITH AXIALLY MOVEABLE ROTOR
Filed May 21, 1964
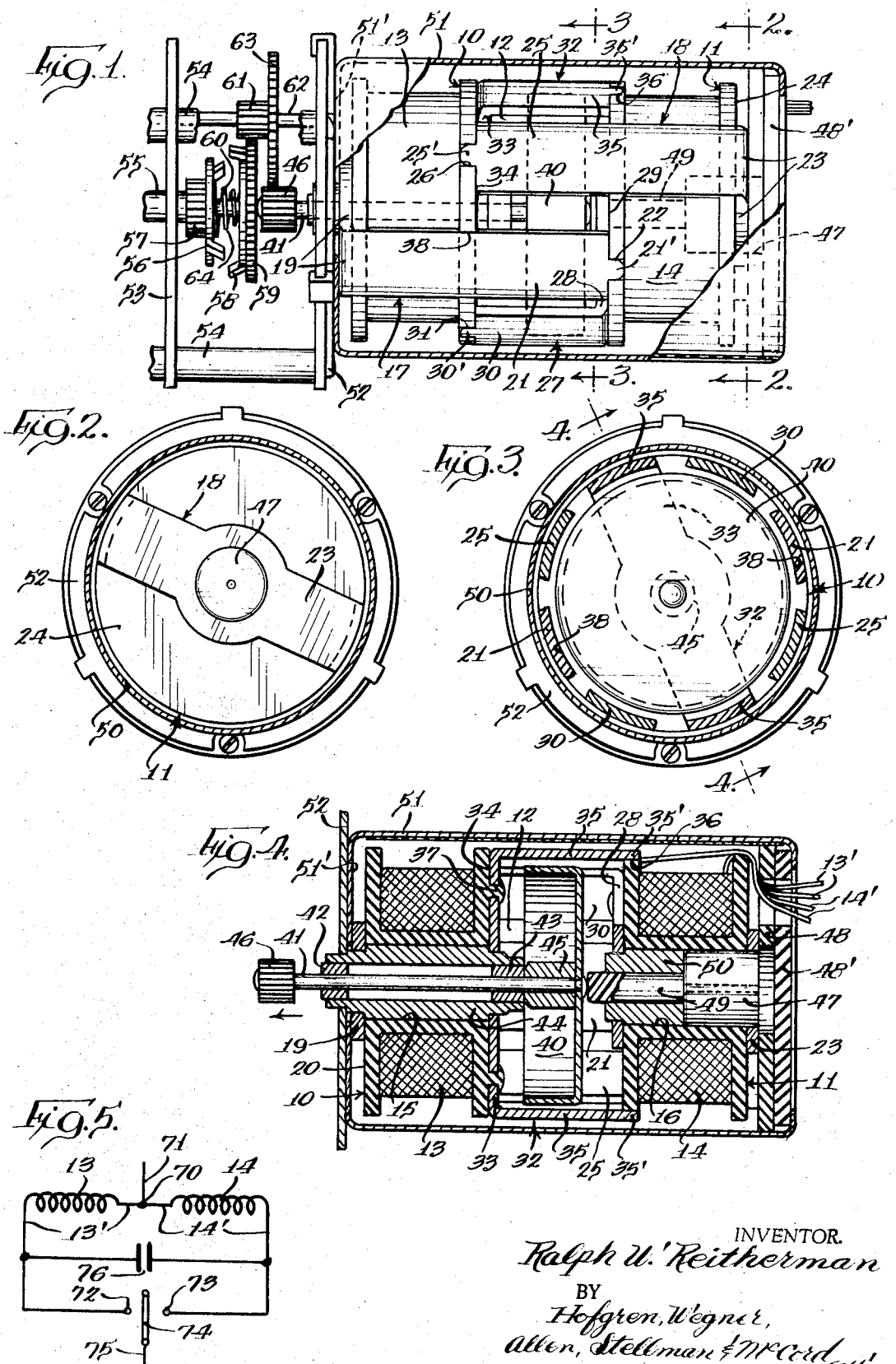
INVENTOR.
Ralph W. Reitherman
BY
Hofgren, Wegner,
Allen, Stellman & McCord
Attys United States Patent Office 3,530,321
Patented Sept. 22, 1970

3,530,321
ELECTRIC MOTOR WITH AXIALLY MOVABLE ROTOR
Ralph W. Reitherman, Lake Villa, Ill., assignor to Skill-Di, Inc., a corporation of Illinois
Filed May 21, 1964, Ser. No. 369,154
Int. Cl. H02k 7/12
U.S. Cl. 310—75                     5 Claims

ABSTRACT OF THE DISCLOSURE

An electric motor having a pair of axially spaced stator coils and an interleaved stator pole structure extending between them. A rotor is mounted between the two stator coils on a shaft which extends axially through the center of one of the stators and has a pinion mounted on the other end, for connection with a gear train. A magnetic slug is slidably positioned in the core of the other stator and has an actuating member for engagement with the rotor. Upon energization of the motor, the magnetic slug is drawn into the stator coil, displacing the rotor and shaft to a second axial position for rotation. In the second axial position, the drive pinion on the shaft, or some other element of the gear train, is engaged.

---

It is the general object of the invention to provide a new and improved two phase electric motor.

Another object is to provide such a motor of simple construction having bobbin wound coils.

A further object is to embody in such a motor a rotor shaft and rotor which are axially shiftable to form a clutch engaging means together with means for shifting said parts upon energization and de-energization of the motor.

Other objects and advantages will become apparent from the following detailed description taken in connection with the accompanying drawings in which:

FIG. 1 is an elevational view of a preferred form of the invention.

FIG. 2 and FIG. 3 are sections along the lines 2—2 and 3—3 of FIG. 1.

FIG. 4 is a longitudinal central section through the motor; and

FIG. 5 is a circuit diagram.

As shown in the drawings, the invention in its preferred form comprises a two phase stator winding on a pair of winding spools or bobbins 10 and 11 from are spaced apart axially to form a rotor space 12 therebetween, and have windings 13 and 14 thereon. A bore 15 extends through the bobbin 10 and a bore 16 extends through the bobbin 11. The windings have leads 13' and 14', respectively.

The magnetic part of the stator is in the form of a structure which secures the bobbins together in spaced relation and includes a pair of U-shaped members 17 and 18, the member 17 having a connecting portion 19 extending across the outside face 20 of the bobbin 10 and a pair of parallel portions 21 forming pole pieces extending across the bobbin 10 and the rotor space 12 and provided with end lugs 21' interengaging with notches 22 in the adjacent end of the bobbin 11. The member 18 has a connecting portion 23 extending across the outside face 24 of the bobbin 11, and a pair of parallel portions 25 forming pole pieces extending across the bobbin 11 and the rotor space 12 and provided with end lugs 25' interengaging with notches 26 in the adjacent end of the bobbin 10. In addition, a U-shaped member 27 has a connecting portion 28 extending across the inside face 29 of the bobbin 11 and a pair of parallel portions 30 forming pole pieces extending across the rotor space 12 and provided with end lugs 30' interengaging with notches 31 in the adjacent end of the bobbin 10, and a U-shaped member 32 has a connecting portion 33 extending across the inside face 34 of the bobbin 10 and a pair of parallel portions 35 forming pole pieces extending across the rotor space 12 and provided with end lugs 35' interengaging with notches 36 in the adjacent end of the bobbin 11. As shown in FIG. 4, the connecting portion 33 of the U-shaped member is secured to the face 34 of bobbin 10 by riveting at 37, and as shown best in FIGS. 1 and 3, the parallel portions 21 and 25 of the U-shaped members 17 and 18, respectively, fit in peripheral notches 38 in the bobbins to secure the U-shaped members to the bobbins and form a rigid stator structure.

A cup-shaped rotor 40 is located in the rotor space 12 and is fixed to the inner end of a shaft 41 which is supported in bearings 42 and 43 mounted in a tubular core member 44 of magnetic material which is secured in the bore 15 and is fixed at its ends to the connecting portions 19 and 33. A spacer 45 on the right-hand end of the shaft 41 (FIG. 4) limits the movement of the rotor toward the left to the position shown. A pinion 46 on the left-hand or outer end of the shaft is spaced from the adjacent bearing 42 to permit the shaft and rotor to shift toward the right from the position shown.

In the preferred form of the invention the stator structure includes a movable core piece in the form of a cylindrical member 47 of magnetic material which is slidably fitted into the bore 16 of the bobbin 11 for movement from the position shown in FIG. 4 to a position to the right thereof in which it extends through an aperture in connecting portion 23, through an apertured plate 48 and against a closure plate 48'. A pin 49 of plastic material forms an actuator between the rotor shaft 41 and the movable core piece 47 and is slidably supported in a fixed core piece 50 of magnetic material pressed into the bore 16 of the bobbin 11 and into an aperture in the connecting portion 28. Being located within the winding 14 on the bobbin 11 and normally spaced from the fixed core piece, the movable core piece 47, upon excitation of the winding, acts as a solenoid armature and moves from a position against the plate 48 as shown in FIG. 1, to the position shown in FIG. 4 against the fixed core piece, and thereby moves the rotor and its shaft to the position shown.

The movement of the rotor shaft to its left-hand position as in FIG. 4 may be utilized to engage a clutch or to perform some other function. As shown in the drawings, the motor stator is enclosed in a cylindrical casing 51 which has a closed end 51' secured to a mounting plate 52. A second plate 53 is suitably secured to the plate 52 by a plurality of spacers 54 and carries a hollow shaft 55 in line with the motor shaft 41. A first clutch member 56 is secured to a pinion 57 on the hollow shaft and is adapted to be engaged by a second clutch member 58 secured to a gear 59 carried on a shaft 60 which extends into and is supported by the hollow shaft 55. Gear 59 meshes with a pinion 61 which is supported on a parallel shaft 62 and is secured to a gear 63 meshing with the motor pinion 46. A coiled spring 64 normally acts to disengage the clutch members and to move the rotor shaft, rotor, pin 49 and armature 47 to the positions shown in FIG. 1 when the motor windings are de-energized.

Upon energization of the motor windings the movable core piece 47 moves the rotor shaft 41 toward the left (FIGS. 1 and 4) whereupon the left-hand end of the shaft, engaging against the adjacent face of the gear 59, moves that gear and the associated clutch member 58 into engagement with the clutch member 56, thus overcoming the normal clutch disengaging effect of the spring 64. Upon de-energization of the motor windings, the spring acts to disengage the clutch members.

FIG. 5 is a diagram showing a circuit for connecting the two phase motor to a single phase power source in a manner to provide for reversing the motor. One lead 13' and 14' of the windings 13 and 14 are joined at 70 to one supply line 71. The other leads 13' and 14' connect the other ends of the coils to contacts 72 and 73 of a double throw single pole switch which has a movable member 74 connected to another supply line 75. A condenser 78 is connected between the leads 13' and 14'.

It is believed apparent that applicant has provided a motor of simple construction embodying a means automatically operable upon energization of the motor for rotation in either direction to shift the rotor from its normally inoperative position axially to an operative position in such a way that the axial movement of the rotor can readily be utilized to engage a clutch or perform other auxiliary functions. Preferably, a spring or other suitable means is provided for normally maintaining an air gap between the movable core piece and the fixed core piece so that when the windings are energized, the movable core piece is pulled against the fixed core piece with a substantial amount of energy and acts to solidify the core in that bobbin and the magnetic circuit to the associated pole pieces as well as to effect the actuation of a clutch.

I claim:

1. A two phase motor comprising, in combination, a stator having a pair of bobbins spaced apart axially to form a rotor space and having bores therethrough and separate stator windings thereon, a stator cage comprising a pair of U-shaped magnetic members each having its connecting portion extending across the outside end of one of the bobbins and the parallel portions extending over the rotor space between the bobbins to form pole pieces and a pair of U-shaped magnetic metal members having their connecting portions extending across the adjacent ends of the bobbins and the parallel portions extending over the rotor space to form pole pieces, a hollow bushing forming a core extending through the bore of one of said bobbins and magnetically connecting the portions of the U-shaped magnetic members extending across the ends of said bobbin, a rotor in the rotor space carried on a shaft extending through said bushing and rotatably supported for limited axial movement in the bushing, a hollow metal core piece extending part way through the bore in the other bobbin and magnetically connected to the connecting portion of the U-shaped magnetic member extending across the inner end of said other bobbin, a cylindrical core piece supported in said bore of the other bobbin adapted when engaging said hollow core piece to cooperate therewith to form a core through said second bobbin magnetically connecting the connecting portions of the U-shaped magnetic members extending across the ends of said second bobbin, said cylindrical core piece having limited axial movement in said bore, means normally acting to form an air gap between the movable core piece and the cooperating metal core piece, and an actuator pin intermediate said movable core piece and the rotor and operable to shift the rotor axially when the motor is energized and the air gap between the core pieces is closed.

2. A motor comprising, in combinaton, a stator having a pair of bobbins spaced apart axially to form a rotor space and having bores therethrough and separate stator windings thereon, a magnetic stator structure having pole pieces adjacent said rotor space, a hollow bushing forming a core in the bore of one of said bobbins, a fixed metal core piece extending part way through the bore in the other bobbin, and a movable cylindrical core piece supported in said bore of the other bobbin and adapted when engaging said fixed core piece to form a core in said second bobbin, said cylindrical core piece having limited axial movement in said bore, a rotor in the rotor space carried on a shaft extending through the hollow bushing and rotatably supported for limited axial movement in the bushing, means normally acting to form an air gap between the movable core piece and the cooperating fixed core piece, and means intermediate said movable core piece and the rotor and operable to shift the rotor axially when the motor is energized.

3. A motor comprising, in combination, a stator having a pair of bobbins spaced apart axially to form a rotor space and having bores therethrough and separate stator windings thereon, a hollow bushing forming a core extending through the bore of one of said bobbins, a rotor in the rotor space carried on a shaft extending through said bushing and rotatably supported for limited axial movement in the bushing, a metal core piece extending part way through the bore in the other bobbin, a cylindrical core piece supported in said bore of the other bobbin adapted when engaging said metal core piece to cooperate therewith to form a core extending through said second bobbin, said cylindrical core piece having limited axial movement in said bore, pole pieces extending over the rotor space and cooperating with said cores to form a stator, means normally acting to form an air gap between the movable core piece and the cooperating metal core piece, and an actuator pin intermediate said movable core piece and the rotor and operable to shift the rotor axially when the motor is energized.

4. A motor comprising, in combination, a stator having a pair of bobbins spaced apart axially to form a rotor space and having bores therethrough and separate stator windings thereon, a hollow bushing forming a core extending through the bore of one of said bobbins, a rotor in the rotor space carried on a shaft extending through said bushing and rotatably supported for limited axial movement in the bushing, a metal core piece extending part way through the bore in the other bobbin, a movable core piece supported in said bore of the other bobbin adapted when engaging said metal core piece to cooperate therewith to form a core extending through said second bobbin, said movable core piece having limited axial movement in said bore, pole pieces extending over the rotor space and cooperating with said cores to form a stator, and means including an actuator intermediate said movable core piece and the rotor and operable to shift the rotor axially when the motor is energized.

5. A bi-directional motor including a first stator, a second stator, each of said first and second stators including a hollow core and being in axial alignment, a rotor spaced between said stators, a shaft normally mounted in a first axial position in the core of said first stator, output means for transmitting the developed motor torque concentrically mounted on one end of said shaft, said rotor being concentrically mounted on the other end of said shaft, a cylindrical magnetic slug having an actuating member, said slug being slidably positioned in the core of said second stator and responsive to the energization of the motor to thereby cause said rotor and shaft to undergo a predetermined displacement to a second axial position for rotation.

References Cited

UNITED STATES PATENTS

| 2,164,633 | 7/1939 | Barrett | 310—76 |
| 2,501,245 | 3/1950 | White | 310—76 |
| 2,685,043 | 7/1954 | Durant | 310—77 |
| 3,205,383 | 9/1965 | Hurst | 310—162 |
| 3,219,682 | 11/1965 | Kieffcut | 310—162 |

MILTON O. HIRSHFIELD, Primary Examiner

B. A. REYNOLDS, Assistant Examiner

U.S. Cl. X.R.

310—165, 209